C. COLOMBO.
CLEAN-OUT FITTING.
APPLICATION FILED APR. 16, 1909.

954,852. Patented Apr. 12, 1910.

Witnesses
Grace E. Wynkoop
J. E. Thomas

Inventor
Charles Colombo
By Henry A. Welch
Attorney

UNITED STATES PATENT OFFICE.

CHARLES COLOMBO, OF DETROIT, MICHIGAN.

CLEAN-OUT FITTING.

954,852.  Specification of Letters Patent.  Patented Apr. 12, 1910.

Application filed April 16, 1909.  Serial No. 490,201.

*To all whom it may concern:*

Be it known that I, CHARLES COLOMBO, citizen of the United States, residing at Detroit, county of Wayne, State of Michigan, have invented a certain new and useful Improvement in Clean-Out Fittings, and declare the following to be a full, clear, and exact description of the same, such as will enable others skilled in the art to which it pertains to make and use the same, reference being had to the accompanying drawings, which form a part of this specification.

My invention relates to an improvement in soil-pipe fittings, shown in the accompanying drawings and more particularly pointed out in the claim.

One of the objects of this invention is to reduce the number of separate parts heretofore required in connecting a house soil-pipe with the pipe leading to the sewer.

Another object is to provide a clean-out branch integral with the connection between the soil and sewer pipes, the construction being such that the point of connection between the clean-out branch and the fitting will be tangent to the curve of its elbow, whereby a suitable instrument may be readily inserted in the pipe through the open end to remove an obstruction lodged therein.

A further object is to provide means for overcoming the tendency of the pipe to sag at the elbow by providing a suitable footing at this point adapted to rest upon a surface on the same plane with the sewer pipe itself. By forming the elbow to connect the soil and sewer pipes integral with the fitting there is no joint at this point to leak or break as in the case of the separate constructions at present employed.

Other advantages will hereafter appear.

Figures 1, 2:
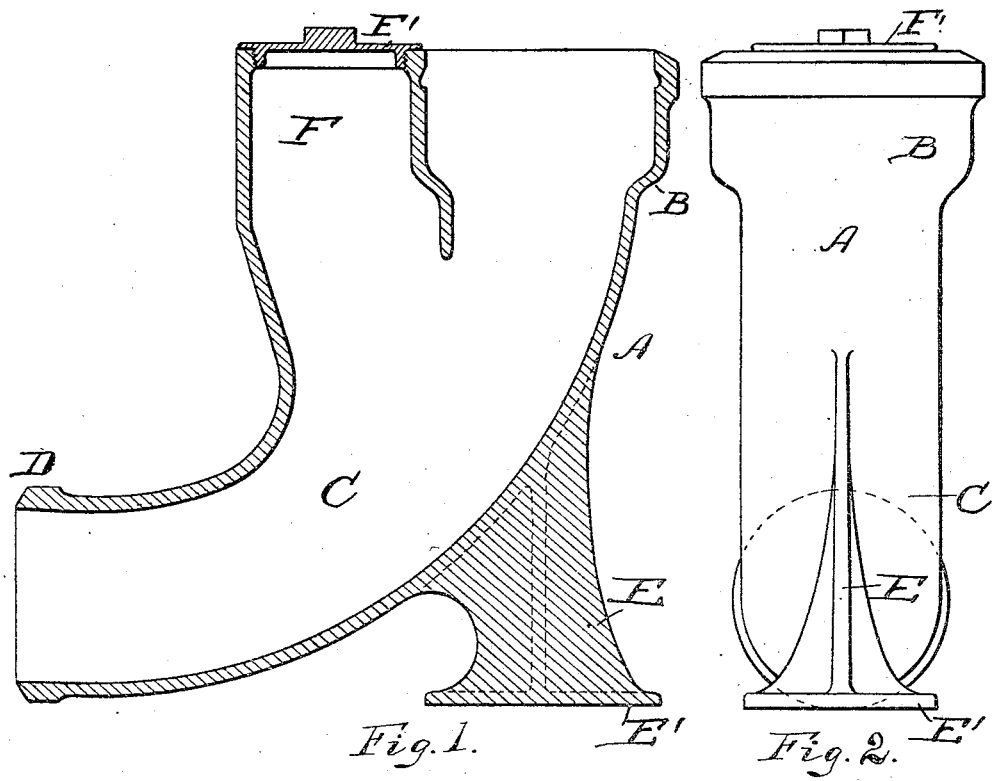
Figure 3:
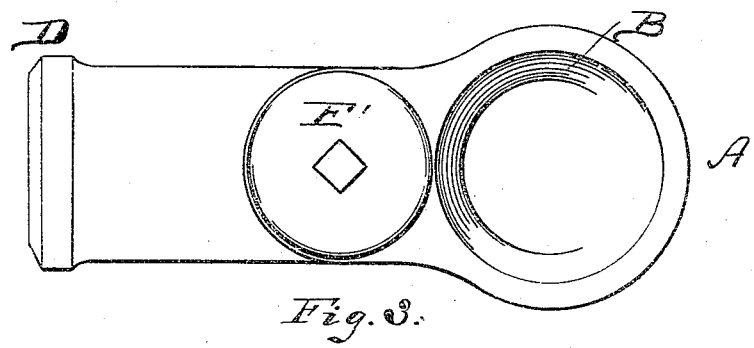

In the drawings accompanying this specification: Figure 1 is a central vertical section through the fitting. Fig. 2 is an end elevation of the same. Fig. 3 is a plan view.

Referring to the letters of reference spread upon the drawings:—A is the fitting. B its hub designed to receive the end of the soil-pipe.

C is the elbow, and D the point of connection with the sewer-pipe (not shown).

E is a leg projecting downwardly from the elbow portion and provided with a foot piece E′, its lower surface being on the same plane with that of the sewer-pipe connecting end D, the object being to support the fitting in its proper relation to the connecting pipes, thereby overcoming the tendency of the elbow to sag at this point.

F is the clean-out branch and F′ is a cap having a screw-threaded connection with the wall of the fitting to close the open end of the clean-out branch.

It will be noticed that the fitting is substantially double the width at its top, or where it connects with the soil-pipe to that of its diameter where it connects with the sewer-pipe, (when viewed in cross-section as shown in Fig. 1), and that the clean-out branch of the fitting is formed on a tangent with the curve of its elbow while its open end is on a plane with the end of the hub B, the object being to make the fitting and pipes easy of access through the clean-out opening whenever necessary to insert a suitable tool through said opening to dislodge or remove an obstruction in the pipes.

Having thus described my invention, what I claim is:—

In a soil-pipe fitting, an elbow adapted to receive the end of the soil-pipe, a clean-out branch formed therewith, the lower portion of the innermost wall of the clean-out branch being confined within the elbow and deflected toward the rear wall of the elbow.

In testimony whereof, I sign this specification in the presence of two witnesses.

CHARLES COLOMBO.

Witnesses:
GEORGE B. GREENING,
ALBERT J. REEBER.